Inventor:
HELMUT MOCZALA
By: Spencer & Kaye
Attorneys

*Inventor:*
HELMUT MOCZALA
By: Spencer & Kaye
Attorneys

United States Patent Office 3,456,174
Patented July 15, 1969

3,456,174
DIRECT CURRENT MOTOR WITH TRANSISTORIZED POWER SUPPLY
Helmut Moczala, Oldenburg, Oldenburg, Germany, assignor to Licentia Patent-Verwaltungs-G.m.b.H., Frankfurt am Main, Germany
Filed July 13, 1966, Ser. No. 564,973
Claims priority, application Germany, July 15, 1965, L 51,131; Sept. 21, 1965, L 51,679, L 51,681
Int. Cl. H02k 29/00; H02p 7/06
U.S. Cl. 318—138                        8 Claims

ABSTRACT OF THE DISCLOSURE

A D.C. motor having a stator and a rotor producing a magnetic field, wherein a plurality of transistors are connected in circuit with a potential source and with respective stator windings, each transistor being operable between a condition wherein the respective stator winding is energized and a condition wherein the stator winding is not energized. The transistors have magnetic field-dependent resistors connected with them in circuit which cause the latter to assume the condition in which the respective stator winding is energized whenever the associated resistor is subjected to a magnetic control field.

---

The present invention relates to a brushless direct current motor having a transistorized power supply. More particularly, the present invention relates to an apparatus for controlling the rotational speed of a motor.

There exist D.C. motors having transistorized power supplies. The transistors usually control the current flow through either the rotor or stator windings. The transistors are normally used as part of a high frequency oscillator circuit.

Such D.C. motors may be used for driving battery-powered tape recorders and record players. Since these instruments are frequently used together with other electronic devices, the high frequency oscillator circuit must be shielded in order to prevent any interference with the other devices.

Accordingly, it is the primary object of the present invention to provide a new and improved transistorized powed supply for a motor.

A second object of the present invention is to provide a rotational speed control for a D.C. motor without using high frequency oscillator circuits.

A further object of the present invention is to control the rotational speed of a motor using magnetic field-dependent resistors.

Means are provided forming stator windings. A potential source is also provided for energizing the windings. A plurality of transistors are connected in circuit with the potential source and with the stator windings. The transistors are each operable between a first condition wherein one of the stator windings is energized and a second condition wherein such one stator winding is deenergized. Finally, a plurality of magnetic field-dependent resistors are connected in circuit with the bases of the transistors whereby each transistor is switched over into its first condition whenever its respective resistor is subjected to a magnetic control field, and whereby the transistor is switched over into its second condition as soon as the influence of said magnetic control field on the respective resistor is interrupted, the field action being dependent on the relative position of the rotor with respect to the stator.

In short: the electronic device has the performance of the commutator and brushes in a conventional D.C. motor.

Additional objects and advantages of the present invention will become apparent upon consideration of the following description when taken in conjunction with the accompanying drawings in which.

Figure 1:
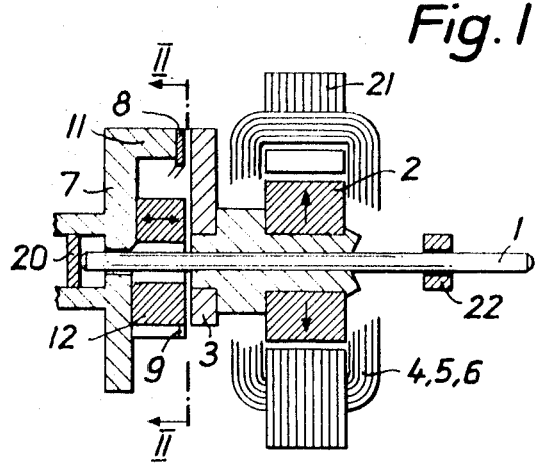
FIGURE 1 is a partly sectional diagrammatic view of a motor showing the mechanical constructional details.

Referring to the drawings, and, more particularly to FIGURE 1, it can be seen that the motor is provided with a rotatable shaft 1. Arranged on the shaft 1 is a two pole rotor 2 which is made of permanent magnetic material that is radially magnetized as indicated by the arrows in FIGURE 1. Also mounted on the shaft 1 is a segment member 3 which is made of soft iron. The outline of the segment 3 can best be seen in FIGURE 2.

The bearing for the shaft 1 at the left-hand end of the rotor is a thrust bearing while the other bearing 22 for the shaft is illustrated as a ball bearing. In order not unnecessarily to complicate the drawing, the housing of the motor has not been illustrated.

The control core 7 of the electronic commutator is arranged at the left end of the shaft and the core 7 simultaneously serves as a bearing for the shaft and as a bearing bracket. Accordingly, the control core can advantageously be made of sintered metal.

The stator 21 is provided with three spaced coils or windings 4, 5 and 6. These are angularly spaced about the periphery of the stator 21 equidistant from each other. Opposite the stator windings 4, 5 and 6 are arranged three resistors 8, 9 and 10, the angular displacement of which can best be seen in FIGURE 2. The resistors 8, 9 and 10 are of a type which has a resistance that varies with the magnetic field to which it is subjected.

In order to mount the resistors properly on the control core 7, three leg portions 11 are disposed about the control core. The height of the leg portion is substantially the same as the height of the magnet 12 which is arranged coaxially about the shaft 1 of the motor, and which rests with one side thereof against the control core 7. The permanent magnet 12 is axially magnetized as indicated by the arrows.

As can be seen from FIGURE 1, the magnetic circuit about the control core 7 is completed through the soft iron segment 3. Accordingly, the completion of the magnetic circuit depends upon the rotor position. In the illustrated position of FIGURE 1, the magnetic circuit extends from the permanent magnet 12, through the control core 7, the leg portion 11, the resistor 8, through the air gap to the soft iron segment 3 and back through the second air gap to the permanent magnet 12.

As indicated above, the resistors 8, 9 and 10 are magnetic field-dependent resistors. They may be made from indium antimonide and are illustrated in the shape of field plates.

Figure 2:
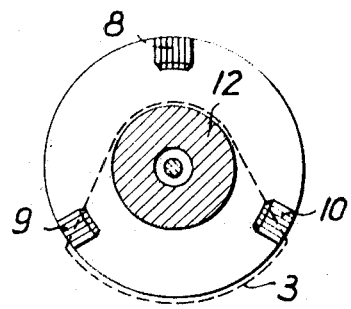
FIGURE 2 is a cross-sectional view taken along the lines II—II of FIGURE 1.
Figure 3:
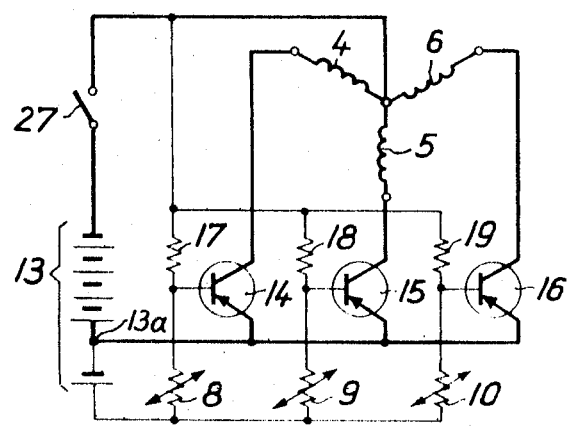
FIGURE 3 is an electrical schematic diagram showing a first embodiment of a transistorized power supply and the connections by which the operation of the motor is effected.

FIGURE 3 shows the transistorized power supply for the motor illustrated in FIGURES 1 and 2. Each of the stator windings 4, 5 and 6 is provided with a respective transistor for purposes of current energization. Thus the transistor 14 is arranged between the potential source 13 and the stator winding 4 while the transistors 15 and 16 are similarly connected to stator windings 5 and 6, respectively.

The base of each of the transistors 14, 15 and 16 is connected with a respective voltage divider. That is, the base of the transistor 14 is connected to the junction between a resistor 17 and the magnetic field-dependent resistor 8; the base of the transistor 15 is connected to the junction between the resistor 18 and the magnetic field-dependent resistor 9; and the transistor 16 is connected between the junction of the resistor 19 and the magnetic field-dependent resistor 10. Each of the voltage dividers is connected across the entire potential source 13 while the emitters of the transistors 14, 15 and 16 are connected together and to a tap 13a of the potential source 13. When a particular transistor conducts, current will flow through the respective emitter-collector path of the conducting transistor to the respective stator winding. On the other hand the transistors 14, 15 and 16—shown as PNP transistors—will remain non-conductive as long as the potential on the base electrode is higher than the potential on the emitter electrode.

In operation, the switch 27 applies the potential source 13 across the circuit.

As the soft iron segment 3 is in a position which is adjacent one of the magnetic field-dependent resistors 8, 9 or 10, the magnetic field will be completed through the segment and the resistance of the particular resistor will substantially increase. Thus the voltage drop across such resistor will also increase and the potential at the respective base will decrease, rendering such transistor conductive. In this way the rotor will start moving, and, consequently, each of the stator coils 4, 5 and 6 will, due to the rotation of the rotor, be energized cyclically, i.e., one of the stator windings will always be energized while the other two are not energized.

A structural advantage results from the mechanical arrangement illustrated in FIGURE 1. Since a constant attraction exists between the permanent magnet 12 and the soft iron segment 3, the shaft 1 of the motor will at all times be urged against the bearing plate 20, so that the motor may also be used in a vertical position. The permanent magnet 12 may be made, for example, from oxidized material.

The present invention is not limited to the use of only three field plates in conjunction with three stator coils. With a different number of stator coils, a different number of field plates will be used and the angular displacement of the field plates would also change. For example, where there are n stator windings, n field plates will be provided, the field plates being arranged about the circumference of the core and being separate from each other by an angle of $360°/n$. In the case of a two-pole rotor, the soft iron segment will subtend an angle of $360°/n$. If a 2p-pole rotor is used where $p>1$ and where there are a plurality of soft iron segments, each will subtend an angle of $$p\frac{360°}{n}$$

When a rotor is used having more than two poles, the soft iron segment 3 is sub-divided into several parts which will then cover a corresponding smaller angle.

Figure 4:
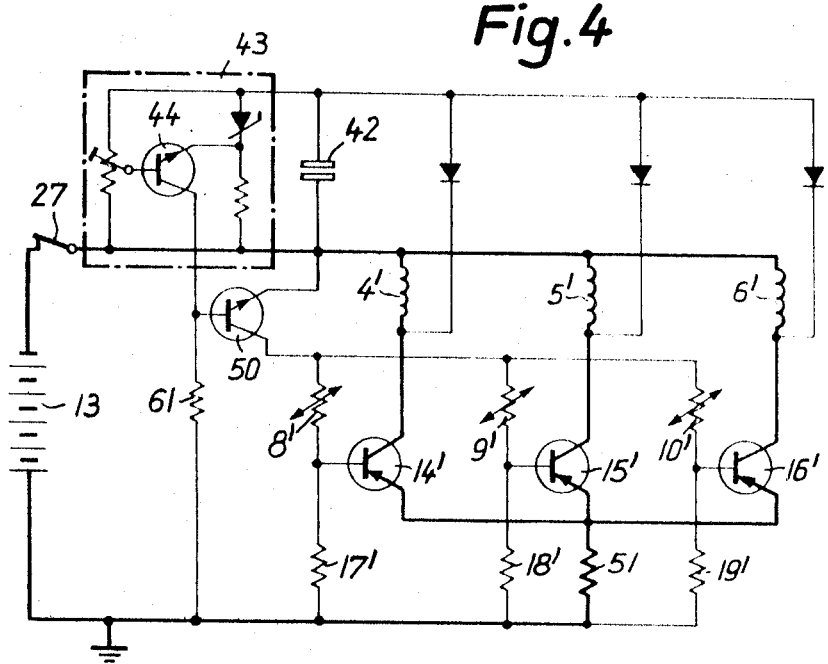
FIGURES 4 and 5 are electrical schematic diagrams of further embodiments of the present invention, with an additional feature for controlling the speed of the motor shown in FIGURES 1 and 2.

A further embodiment of the invention is shown in FIGURE 4. This circuit includes stator windings 4', 5', and 6'. Transistors 14', 15' and 16' are respectively arranged in circuit with the stator windings 4', 5' and 6'.

As before, the base of each of the transistors is connected to the junction point of a voltage divider. Thus, the base of the transistor 14' is connected to the junction between a resistor 17' and a magnetic field-dependent resistor 8'; the base of the transistor 15' is connected to the junction between the resistor 18' and a magnetic field-dependent resistor 9'; and the base of the transistor 16' is connected to the junction of a resistor 19' and the magnetic field-dependent resistor 10'. However, the three voltage dividers are not directly connected across the potential source 13. Rather, they are connected to the collector of a transistor 50 which is a NPN transistor. The base of the transistor 50 is connected between a resistor 61 and a transistor 44. The transistor 44 is connected in the null circuit of a bridge circuit 43. A capacitor 42 is also connected across the bridge circuit 43. A potential which is dependent upon the rotational speed of the motor is applied across the capacitor 42 and the bridge circuit 43. That is, this potential is derived in the same manner of a tachometer potential. The tachometer potential may be applied, for example, in the manner shown in copending application Ser. No. 380,266, filed July 6, 1964, of Julian Hartmann and Helmut Moczala, now Patent No. 3,290,572 issued Dec. 6, 1966.

Also shown in the circuit of FIGURE 4 is a resistor 51 which is connected at the common point of all the emitters of the transistors 14', 15' and 16'. The resistor 51 serves the purpose of improving the commutation.

The potential source 13 has its positive terminal connected to ground potential while its negative terminal is connected to one side of the switch 27.

In operation, the switch 27 is closed to apply the potential of the source 13 across the series arrangement of the transistors and stator windings. The voltage dividers are proportioned such that the transistor 50 is conducting while the transistor 44 is non-conducting. As with the arrangement of FIGURES 1 to 3, a soft iron segment rotates together with the shaft of the motor and will subject a magnetic field-dependent resistor to the magnetic field developed by the permanent magnet 12 of the control core 7.

The angular arrangement of the soft iron segment is such that it will at all times be positioned opposite two of the magnetic field dependent field resistors, 8', 9' and 10'. The remaining field-dependent resistor which is not subjected to the magnetic field will have a lower resistance than the other two resistors. Due to its arrangement in the voltage divider circuit, the transistor with which this resistor is associated will be driven into its conductive condition. Thus, as before, each of the stator windings 4', 5' and 6' will be cyclically energized, depending upon the position of the soft iron segment which, in turn, is dependent upon the position of the rotor of the motor.

This condition will continue in the same manner as in the arrangement in FIGURE 3 until some preselected rotational speed is reached. At this rotational speed, the conditions within the bridge circuit 43 are changed in such manner that the control transistor 44 becomes conductive. This cuts off the transistor 50 thereby raising the potential of each of the bases of the transistors 14', 15' and 16', so that these transistors will be cut off. That is, all three transistors 14', 15' and 16' will be cut off at the same time. This will not be affected by the position of the soft iron segment once the preselected rotational speed has been raeched.

Since none of the stator windings will be energized, the rotational speed of the motor will decrease. When the rotational speed falls below the preselected value, the control transistor 44 will be operated into its non-conductive condition. This will render the transistor 50 conductive and the three transistors 14', 15' and 16' will return to their normal operating conditions. At this time, one of these transistors will be conductive in a cyclical manner, thereby respectively energizing the stator windings 4', 5' and 6'.

As the rotational speed again increases until the preselected speed is reached, the above cycle will be repeated and the rotational speed of the motor will decrease. In the above described manner, the rotational speed of the motor can be precisely controlled.

Figure 5:
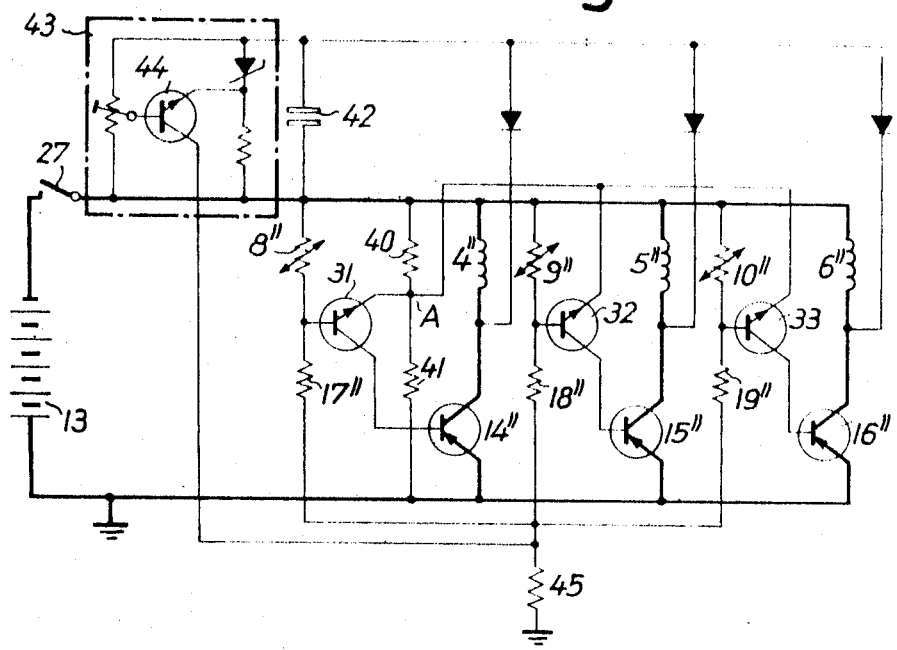

A further arrangement incorporating the principles of the present invention is illustrated in FIGURE 5. The circuit shown in this figure includes stator windings 4'', 5'' and 6'' which are arranged in circuit, respectively, with transistor 14'', 15'' and 16''. In the circuit of FIGURE 5, the base of each of the transistors 14'', 15'' and 16'' is respectively connected to a different transistor.

Thus, the base of the transistor 14'' is connected to the collector of a transistor 31, the base of the transistor 15" is connected to the collector of the transistor 32; and the base of the transistor 16" is connected to the collector of the transistor 33. It should be noted that the transistors 31, 32 and 33 are NPN transistors.

The emitters of the transistors 31–33 are connected together. The base of transistor 31 is connected to a voltage divider made up of the magnetic field-dependent resistor 8" and the resistor 17"; the base of the transistor 32 is connectd to the voltage divider made up of the magnetic field-dependent resistor 9" and the resistor 18"; and the base of the transistor 33 is connected to the voltage divider made up of the magnetic field-dependent resistor 10" and the resistor 19". The bottom ends of the voltage dividers are connected together and to ground through a common resistor 45.

The emitters of the transistors 31, 32, 33 are also connected to a voltage divider made up of the resistors 40, 41, 42, 43, 44, 45, 46, 47, arranged across the potential source 13. As before, the tachometer potential is applied across the capacitor 42 and the bridge circuit 43. The control transistor 44 has its collector connected to the resistor 45 and in this way is connected to the bases of the transistors 31, 32, 33. As before, the control transistor 44 is connected in the null circuit of the bridge 43.

In operation, the switch 27 is closed applying the potential of the potential source 13 across the transistors 14", 15", 16" and the stator windings 4", 5", 6". Depending upon the position of the rotor and the corresponding position of the soft iron segment, one of the transistors 14", 15" and 16" becomes conductive while the other two transistors remain non-conductive. For example, if the soft iron segment subjects the resistor 8" to the magnetic field of the control core, its resistance will increase substantially. This will increase the potential at the base of the NPN transistor 31, thereby rendering it conductive. This, in turn, will connect the base of the transistor 14" to the potential A of the voltage divider made up of the resistors 40 and 47 and will render the transistor 14" conductive. Thus, the stator winding 4" will be energized.

When the transistor 31 becomes conductive, the potential at the point A will increase so that the emitters of the two other transistors 32 and 33 will also become more positive. This will insure the fact that the NPN resistors 32 and 33 will in no case become conductive while the transistor 31 is conductive.

As the position of the rotor and the soft iron segment changes with respect to the magnetic field-dependent resistors, each of the transistors 14", 15" and 16" will become conductive, thereby energizing the respective stator windings 4", 5" and 6".

In this way, the rotational speed of the motor will increase until a preselected speed is reached. At this point, the bridge circuit 43 which has the tachometer voltage applied thereacross will become unbalanced and the normally cut off transistor 44 will become conductive. When this occurs, the transistor 44 will conduct current through the resistor 45 and the emitter-collector path of the transistor 44. This will lower simultaneously the potential of each of the bases of the NPN transistors 31, 32 and 33. This will maintain the transistors 31–33 in non-conductive condition, irrespective of the position of the soft iron segment on the rotor.

When the above occurs, none of the stator windings will be energized and the motor will decrease in speed. Once the rotational speed of the motor is decreased below the preselected level, the bridge 43 will again be balanced and the control transistor 44 will again be cut off. At this point, the regular controls can take over and one of the transistors 14", 15" 16" will again become conductive depending upon the position of the soft iron segment on the rotor of the motor. In this way, the rotational speed of the motor can be maintained at a preselected level with a great degree of accuracy.

In practice, the resistance of the resistor 45 is very high so as to increase its regulating effect.

It is thus seen that several embodiments for controlling the speed of the brushless D.C. motor of FIGURE 1 have been provided. No high-frequency oscillator circuits are used in the control of the rotational speed. Accordingly, there need be no concern over the interference of the control circuit with any adjacent electronic devices.

It will thus be seen that, in accordance with the present invention, there is provided a D.C. motor control arrangement in which a number of transistors are connected in circuit with a potential source and with respective stator windings, each transistor being operable between a first condition wherein the respective stator winding is energized and a second condition wherein the respective stator winding is not energized, the transistors normally being in their second condition. Moreover, there are a plurality of magnetic field-dependent resistors each connected in circuit with the transistors—in practice, there will be one resistor in circuit with each respective transistor—for causing the transistors to assume their first condition whenever a respective resistor is subjected to the magnetic field of the rotor.

It will be understood that the above description of the present invention is susceptible to various modifications, changes and adaptations, and the same are intended to be comprehended within the meaning and range of equivalents of the appended claims.

What is claimed is:

1. In a D.C. motor having a rotor producing a magnetic field and a stator, the combination which comprises:
    (a) means forming stator windings;
    (b) a potential source for energizing said windings;
    (c) a plurality of transistors each connected in circuit with said potential source and a respective one of said stator windings, each transistor being operable between a first condition wherein its respective stator winding is energized and a second condition wherein said respective stator winding is not energized;
    (d) a plurality of magnetic field-dependent resistors each connected in circuit with said transistors for causing the same to assume their first condition whenever a respective resistor is subjected to a magnetic control field, whereby said magnetic field influence depneds on the relative position between the rotor and the stator;
    (e) a control transistor arranged in circuit with said magnetic field-dependent resistors, said transistor being operable between a conducting and a non-conducting condition and being normally in its conducting condition; and
    (f) speed-responsive means for operating said control transistor into its non-conducting condition when a pre-selected rotational speed of the motor is reached whereby while said control transistor is in its non-conducting condition, no current flows through said magnetic field-dependent resistors.

2. The combination as claimed in claim 1 wherein said speed-responsive means includes a bridge circuit arrangement having a second control transistor arranged in the null circuit of said bridge circuit, said second control transistor being connected in circuit with said first control transistor, said second control transistor being operable between its conductive condition and its non-conductive condition and being normally in its non-conductive condition, said speed responsive means operating said second control transistor from its non-conductive condition into its conductive condition when said pre-selected operating rotational speed is reached whereby said first control transistor is operated from its conducting condition into its non-conductive condition.

3. The combination as claimed in claim 2 wherein the emitter of said second control transistor is directly connected to the base of said first control transistor.

4. The combination as claimed in claim 3 wherein first and second control transistors are of opposite type to said plurality of first transistors.

5. In a D.C. motor having a rotor producing a magnetic field and a stator, the combination which comprises:
   (a) means forming stator windings;
   (b) a potential source for energizing said windings;
   (c) a plurality of first transistors each connected in circuit with said potential source and a respective one of said stator windings, each transistor being operable between a first condition wherein its respective stator winding is energized and a second condition wherein said respective stator winding is not energized;
   (d) a plurality of magnetic field-dependent resistors each connected in circuit with said first transistors for causing the same to assume their first condition whenever a respective resistor is subjected to a magnetic control field, whereby said magnetic field influence depends on the relative position between the rotor and the stator;
   (e) a plurality of second transistors arranged in circuit with said plurality of first transistors, one of said second transistors being arranged respectively in circuit with one of said first transistors, said second transistors being of opposite type to said first transistors and being operable between a conducting condition and a non-conducting condition; and
   (f) speed-responsive means connected in circuit with said plurality of said second transistors for rendering and maintaining said second transistors in their non-conducting conditions when a pre-selected operating speed is reached.

6. The combination as claimed in claim 5 wherein the collector of each of said second transistors is respectively connected directly to the base electrode of its respective first transistor.

7. The combination as claimed in claim 5 wherein said speed adjusting means is arranged in the form of a bridge circuit having a control transistor arranged in the null circuit thereof, the collector of said control transistor being connected to all of the bases of said plurality of second transistors whereby when said pre-selected operating speed is reached, said control transistor is operated from its non-conductive condition into its conductive condition and renders and maintains said plurality of second transistors in non-conductive condition.

8. The combination as claimed in claim 5 wherein the emitters of said plurality of second transistors are connected to a common voltage divider consisting of two resistors arranged across said potential source.

References Cited

UNITED STATES PATENTS 3,305,717   2/1967   Weiss _____ 318—254

ORIS L. RADER, Primary Examiner

G. Z. RUBINSON, Assistant Examiner

U.S. Cl X.R.

318—254